United States Patent
Freier et al.

(10) Patent No.: US 9,335,015 B2
(45) Date of Patent: May 10, 2016

(54) OFF-AXIS CASSEGRAIN SOLAR COLLECTOR

(71) Applicant: 3M INNOVATIVE PROPERTIES COMPANY, St. Paul, MN (US)

(72) Inventors: David G. Freier, St. Paul, MN (US); Timothy L. Quinn, Maplewood, MN (US); Thomas R. Corrigan, St. Paul, MN (US); Byron E. Trotter, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/373,683

(22) PCT Filed: Jan. 18, 2013

(86) PCT No.: PCT/US2013/022051
§ 371 (c)(1),
(2) Date: Jul. 22, 2014

(87) PCT Pub. No.: WO2013/112362
PCT Pub. Date: Aug. 1, 2013

(65) Prior Publication Data
US 2015/0009567 A1 Jan. 8, 2015

Related U.S. Application Data

(60) Provisional application No. 61/589,544, filed on Jan. 23, 2012.

(51) Int. Cl.
*F21S 11/00* (2006.01)
*F24J 2/06* (2006.01)
(Continued)

(52) U.S. Cl.
CPC ............. *F21S 11/005* (2013.01); *F21S 11/007* (2013.01); *F24J 2/067* (2013.01); *F24J 2/12* (2013.01);
(Continued)

(58) Field of Classification Search
CPC ...... F21S 11/002; F21S 11/005; Y02E 10/42; G02B 19/0042
USPC .......................................... 359/591–592, 597
See application file for complete search history.

(56) References Cited

U.S. PATENT DOCUMENTS

| | | |
|---|---|---|
| 3,239,660 A | 3/1966 | Hall |
| 3,887,263 A | 6/1975 | Thompson, III |
| 4,270,844 A * | 6/1981 | Cobble et al. .................. 359/853 |
| 4,313,024 A | 1/1982 | Horne |

(Continued)

FOREIGN PATENT DOCUMENTS

| | | | |
|---|---|---|---|
| EP | 1852918 | 11/2007 | |
| WO | WO 2012/021471 | * 2/2012 | ......... G02B 19/0023 |

OTHER PUBLICATIONS

International Search Report for PCT International Application No. PCT/US2013/022051 mailed on Jun. 12, 2013, 4 pages.

*Primary Examiner* — Christ Mahoney

(57) ABSTRACT

The disclosure generally relates to concentrating daylight collectors and in particular to concentrating daylight collectors useful for interior lighting of a building. The concentrating daylight collectors generally include a cassegrain-type concentrator section that provides for a full-tracking solar collector with one moving part and with a high efficiency of coupling of collected solar irradiation to a stationary duct. In some cases, the disclosed concentrating daylight collectors can be used more conventionally, such as for directing sunlight onto a photovoltaic cell for generation of electrical power, or an absorbing surface for extraction of thermal energy.

21 Claims, 13 Drawing Sheets

(51) Int. Cl.
*F24J 2/12* (2006.01)
*F24J 2/18* (2006.01)
*F24J 2/54* (2006.01)
*G02B 7/182* (2006.01)
*G02B 19/00* (2006.01)
*F24J 2/10* (2006.01)

(52) U.S. Cl.
CPC .. *F24J 2/18* (2013.01); *F24J 2/542* (2013.01); *G02B 7/1822* (2013.01); *G02B 19/0023* (2013.01); *G02B 19/0042* (2013.01); *F24J 2002/1038* (2013.01); *Y02B 10/20* (2013.01); *Y02E 10/42* (2013.01); *Y02E 10/47* (2013.01)

(56) References Cited

U.S. PATENT DOCUMENTS

| | | | |
|---|---|---|---|
| 4,462,034 A | | 7/1984 | Betsudan |
| 4,720,170 A | * | 1/1988 | Learn, Jr. ............ 359/597 |
| 6,128,135 A | | 10/2000 | Stiles |
| 6,342,865 B1 | | 1/2002 | Chandler |
| 7,339,739 B1 | * | 3/2008 | Kinney et al. .......... 359/591 |
| 7,639,423 B2 | * | 12/2009 | Kinney et al. .......... 359/591 |
| 8,743,462 B2 | * | 6/2014 | Freier et al. .......... 359/596 |
| 2005/0046977 A1 | | 3/2005 | Shifman |
| 2007/0137640 A1 | | 6/2007 | Tarabishi |
| 2008/0266664 A1 | | 10/2008 | Winston |
| 2013/0081671 A1 | * | 4/2013 | Hui et al. ............ 136/248 |

* cited by examiner

OFF-AXIS CASSEGRAIN SOLAR COLLECTOR

CROSS REFERENCE TO RELATED APPLICATIONS

This application is a national stage filing under 35 U.S.C. 371 of PCT/US2013/022051, filed Jan. 18, 2013, which claims priority to U.S. Provisional Application No. 61/589,544, filed Jan. 23, 2012, the disclosure of which is incorporated by reference in its/their entirety herein.

BACKGROUND

The long-distance transport of visible light through a building can use mirror-lined ducts, or solid fibers which exploit total internal reflection. Mirror-lined ducts include advantages of large cross-sectional area and large numerical aperture (enabling larger fluxes with less concentration), a robust and clear propagation medium (that is, air) that leads to both lower attenuation and longer lifetimes, and a potentially lower weight per unit of light flux transported. Solid fibers include the advantage of configuration flexibility, which can result in relatively tight bends with low light loss. While the advantages of mirror-lined ducts may appear overwhelming, fibers are nevertheless frequently selected because of the practical value of assembling light conduits in much the same fashion as plumbing. Regardless of the technique used to transport light effectively, a practical and efficient daylight collector that can also concentrate the collected light is needed.

SUMMARY

The disclosure generally relates to concentrating daylight collectors and in particular to concentrating daylight collectors useful for interior lighting of a building. The concentrating daylight collectors generally include a cassegrain-type concentrator section that provides for a full-tracking solar collector with one moving part and with a high efficiency of coupling of collected solar irradiation to a stationary duct. In one aspect, the present disclosure provides a solar collector that includes a parabolic reflector having a vertex, a parabolic focal point, and a first axis therebetween; and a hyperbolic reflector having a first focal point coincident with the parabolic focal point, a second focal point, and a second axis including the first and second focal points; wherein the first axis can be aligned at an elevation angle and an azimuth angle without movement of the second axis, such that solar radiation incident upon the parabolic reflector and reflecting from the hyperbolic reflector, propagates within an output collimation angle of the second axis. In another aspect, the present disclosure provides an architectural lighting system that includes the solar collector.

In another aspect, the present disclosure provides a solar collector that includes a parabolic reflector having a vertex, a parabolic focal point, and a first axis therebetween; a hyperbolic reflector having a first focal point coincident with the parabolic focal point, a second focal point, and a second axis including the first and second focal points; an exit aperture disposed in the parabolic reflector and on a plane defined by the first and second axis; and a light duct disposed along the second axis; wherein the first axis can be aligned at an elevation angle and an azimuth angle without movement of the hyperbolic reflector or the light duct. In another aspect, the present disclosure provides an architectural lighting system that includes the solar collector.

In yet another aspect, the present disclosure provides a solar collector that includes a parabolic reflector having a vertex, a parabolic focal point, and a first axis therebetween; a hyperbolic reflector having a first focal point coincident with the parabolic focal point, a second focal point, and a second axis including the first and second focal points; an exit aperture disposed in the parabolic reflector and on a plane defined by the first and second axis; and a light duct disposed along the second axis; wherein the first axis can be aligned at an elevation angle and an azimuth angle, and at least one of the hyperbolic reflector and the light duct rotates around the second axis. In another aspect, the present disclosure provides an architectural lighting system that includes the solar collector.

In yet another aspect, the present disclosure provides a solar collector that includes a parabolic reflector having a vertex, a parabolic focal point, and a first axis therebetween; a hyperbolic reflector having a first focal point coincident with the parabolic focal point, a second focal point, and a second axis including the first and second focal points; a slot disposed in the parabolic reflector and on a plane defined by the first and second axis; and a hollow reflective light duct disposed along the second axis and extending through the slot; wherein the parabolic reflector can be rotated such that the first axis is aligned to the sun at an elevation angle and an azimuth angle without movement of the second axis, such that solar radiation incident upon the parabolic reflector and reflecting from the hyperbolic reflector enters the hollow reflective light duct and propagates within an output collimation angle of the second axis. In another aspect, the present disclosure provides an architectural lighting system that includes the solar collector.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
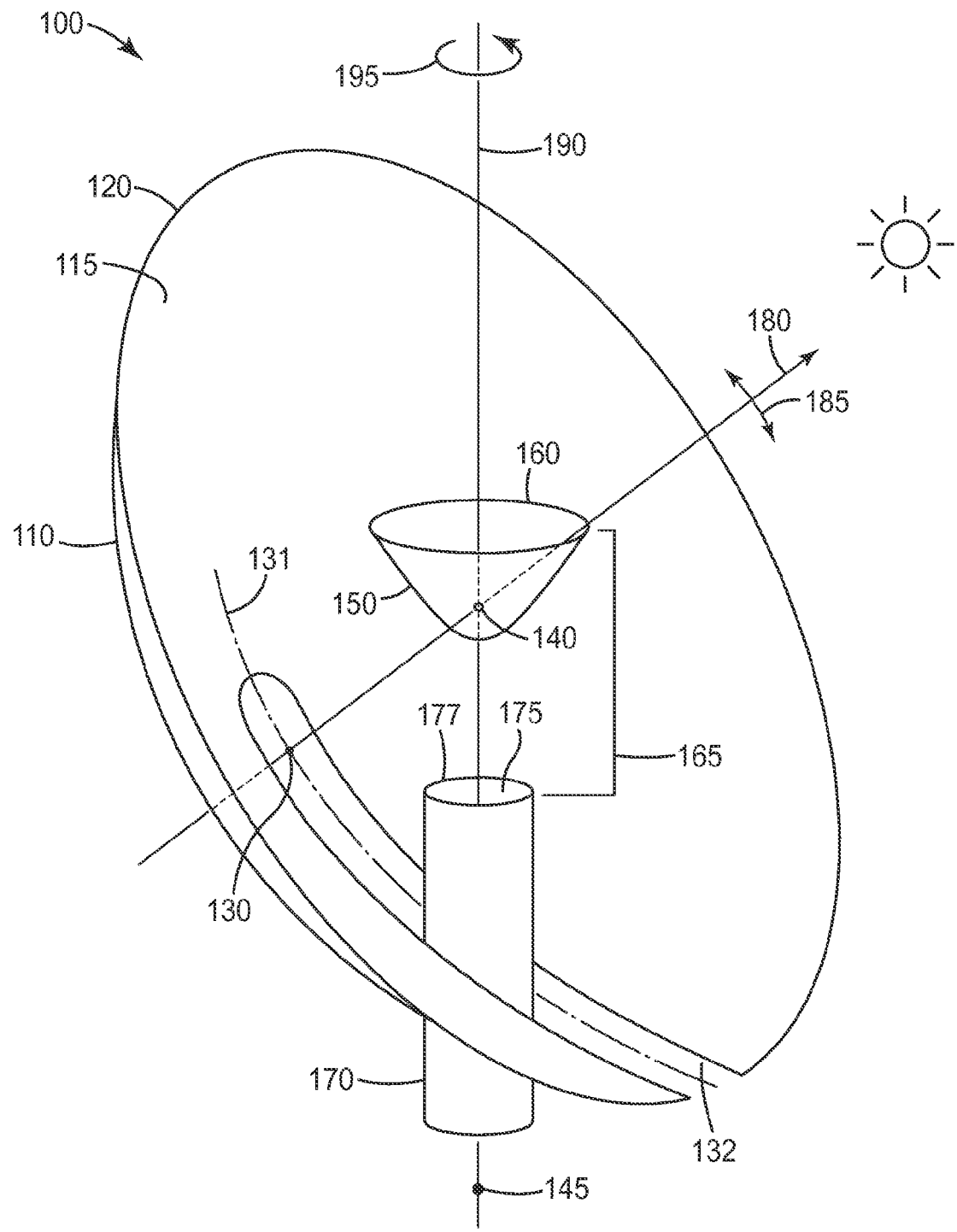
FIG. 1 shows a perspective view of a solar collector.

The present disclosure generally relates to concentrating daylight collectors that can be used for illuminating interior spaces of a building with sunlight. The concentrating daylight collectors direct sunlight into a mirror-lined duct that can be used to distribute the sunlight throughout the building to a point of extraction of the light through a light distribution mirror-lined duct. In some cases, the disclosed concentrating daylight collectors can instead be used more conventionally, such as for directing sunlight onto a photovoltaic cell for generation of electrical power, or an absorbing surface for extraction of thermal energy.

An appropriate figure of merit describing the value of a solar collector for core architectural daylighting is the cost of the collector per lumen of light delivered. Value increases as the cost per lumen decreases. Both reduced cost and increased flux increase the value of a collector. The cost of a collector is largely dictated by its size, its tracking requirements, and its complexity. It is generally not advantageous to sacrifice either size or tracking, as these attributes are critical to high flux. There is, however, the possibility of reducing complexity by minimizing the number of moving parts.

A collector for daylighting can preferably deposit its flux within a stationary duct with the luminance associated with that flux substantially collimated about the axis of the duct. Tracking collectors can therefore include a means for transporting and redirecting a moving and tilting distribution of concentrated luminance to a fixed position and a fixed direction. The value of the collector can be increased by improving the efficiency of this coupling.

Disclosed are an apparatus and technique for a full-tracking solar collector with few moving parts and with an unusually-high efficiency of coupling to a stationary duct. To this end, a Cassegrain concentrator utilizes 1) a parabolic mirror to focus rays incident parallel to the optical axis of the parabola to a point on the optical axis of the parabola, and 2) a hyperbolic mirror, with its interior focus coincident with the parabolic focus, to refocus these rays to the exterior focus of the hyperbola on the optical axis of the hyperbola. In the standard Cassegrain configuration, the axes of the hyperbola and parabola are coincident so that the final focus lies on these common axes. In the off-axis configuration described herein, the axis of the parabola can be tilted relative to the hyperbola axis, so that the final focus lies off the axis of the parabola. The off-axis configuration allows for a stationary final focus, and that this can solve two fundamental problems of solar collectors for daylighting; specifically, the off-axis configuration allows only the parabola to move, and it increases the efficiency of coupling to the stationary duct.

The disclosed solar collector accepts direct solar illuminance over a large area and tracks the sun. Generally, substantially all of the associated flux is injected into a stationary duct, with the luminance associated with that flux substantially collimated about the axis of the duct. In one particular embodiment, the solar collector design uses an off-axis Cassegrain configuration that includes a movable parabolic mirror which tracks the sun, and a stationary hyperbolic mirror and a stationary duct. This configuration can maximize the efficiency of collection while minimizing the number of moving components required for tracking the sun.

The collector can harvest more flux per unit area of its footprint than many alternatives. It can deliver this flux with a higher concentration than any known alternative (enabling small light-distribution ducts), and with a degree of collimation, which is well suited for hollow light-guiding systems with side-wall extraction. In some cases, the concentrating daylight collectors can be positioned either on a roof or on the sun-facing sides of a building. Generally, rooftop placement of a concentrating daylight collector can more readily provide for an unobstructed view of the sun throughout the daylight hours; however, in some cases, mounting on the side of the building may be preferable.

The concentrating daylight collector can be a solar collector/concentrator that tracks the sun's position throughout the day. The concentrating daylight collector harvests highly-collimated solar flux from a large area and deposits it with controlled (and necessarily diminished) collimation within a much smaller area, for example, a mirror-lined duct system for distribution throughout the building.

In one particular embodiment, the concentrating daylight collector can include a Cassegrain-telescope type concentrator, known to those of skill in the art. Such a concentrator typically includes a combination of a parabolic mirror and a hyperbolic mirror. Generally, the focus of the parabolic mirror and one of the focal points of the hyperbolic mirror are placed such that they approximate a common focal point. The second focal point of the hyperbolic mirror can be positioned along the axis of a light duct suitable for collecting the light reflected from the hyperbolic mirror. The light duct can be disposed in a slot that is formed in the parabolic mirror between the vertex and the outer rim of the parabolic mirror. The centerline of the slot lies within the plane containing the parabolic vertex and both the hyperbolic focal points. In this fashion, the parabolic reflector is capable of rotating around the light duct axis such that the concentrating daylight collector tracks the path of the sun. In particular, a line between the parabolic focal point and the vertex can be aligned to an azimuth angle and an elevation angle of the sun, such that light rays are directed toward the parabolic focal point, as described elsewhere.

FIG. 1 shows a perspective view of a solar collector 100, according to one aspect of the disclosure. Solar collector 100 includes a parabolic reflector 110 having an interior reflective surface 115 and a first outer rim 120. The interior reflective surface 115 can be any suitable material having a high specular reflectivity including, for example, a first- or second-surface mirror such as a metal vapor-coated mirror or other reflective metal; the interior reflective surface can instead include a polymeric multilayer interference reflector such as Vikuiti™ ESR film, available from 3M Company. The parabolic reflector 110 has a geometry that can be characterized by a parabolic focal point 140, a vertex 130, and a first axis 180 extending between the vertex 130 and parabolic focal point 140. Solar collector 100 further includes a hyperbolic reflector 150 having a second outer rim 160, a first focal point coincident with the parabolic focal point 140, and a second focal point 145. The hyperbolic reflector 150 can be fabricated from the same or different material that is suitable for the interior reflective surface 115, described above. A second axis 190 extends along a line that includes the parabolic focal point 140 and the second focal point 145.

In one particular embodiment, second axis 190 can be pointed toward the zenith (that is, perpendicular to the horizontal); however, in other embodiments, second axis 190 can be pointed instead at any desired angle or orientation to the zenith. For example, the second axis 190 of the solar collector 100 can be directed toward the horizontal for a building side mounted collector. A tilt angle of the second axis 190 can depend upon the placement of the solar collector 100, including, for example, latitude, unobstructed view, duration and times for optimum daylighting, and the like, as described elsewhere. First axis 180 is capable of rotating about the second axis 190 along an azimuthal direction 195, without movement of the second axis 190. First axis 180 is also capable of rotating along an elevation direction 185 that pivots around the parabolic focal point 140 and lies in the plane that includes the vertex 130 and the second axis 190. In one particular embodiment, first axis 180 can be positioned toward the sun, such that solar radiation incident upon the parabolic reflector 110 and reflecting from the hyperbolic reflector 150, propagates within an output collimation angle of the second axis 190, as described elsewhere.

An optional exit aperture 132 can be disposed in the parabolic reflector 110, along a line 131 passing through the vertex 130 and lying in the plane that includes the vertex 130 and the second axis 190. In some cases, the optional exit aperture 132 can comprise a material that is transparent to solar radiation such as a polymer or a glass; in some cases, the optional exit aperture 132 can be a slot cut in the parabolic reflector 110. In one particular embodiment, the optional exit aperture 132 can extend along the line 131 from the vertex 130 to the first outer rim 120.

An optional light duct 170 can be disposed along the second axis 190, and in the case where the optional exit aperture 132 is a slot, the optional light duct 170 can extend through the parabolic reflector 110 as shown. In some cases, a support structure 165 can affix hyperbolic reflector 150 to optional light duct 170. Support structure 165 can be any suitable support as known to one of skill in the art that supports hyperbolic reflector 150 such that the parabolic focal point 140 and the second focal point 145 remain fixed and do not move. In some cases, support structure 165 can affix hyperbolic reflector 150 to one axis of rotation of the parabolic reflector 110 such that the hyperbolic reflector can rotate about the second axis 190, as described elsewhere. The optional light duct 170 includes an upper rim 177 and an entrance aperture 175 positioned such that light reflected from the hyperbolic reflector 150 enters optional light duct 170 through entrance aperture 175 and is directed toward second focal point 145. Optional light duct 170 can be a portion of a light distribution system (not shown) used for daylight distribution system for architectural lighting. Optional light duct 170 can be a rectangular light duct, a cylindrical light duct, or any other suitably shaped light duct for the efficient transmission of light, as described elsewhere.

Figure 2A:
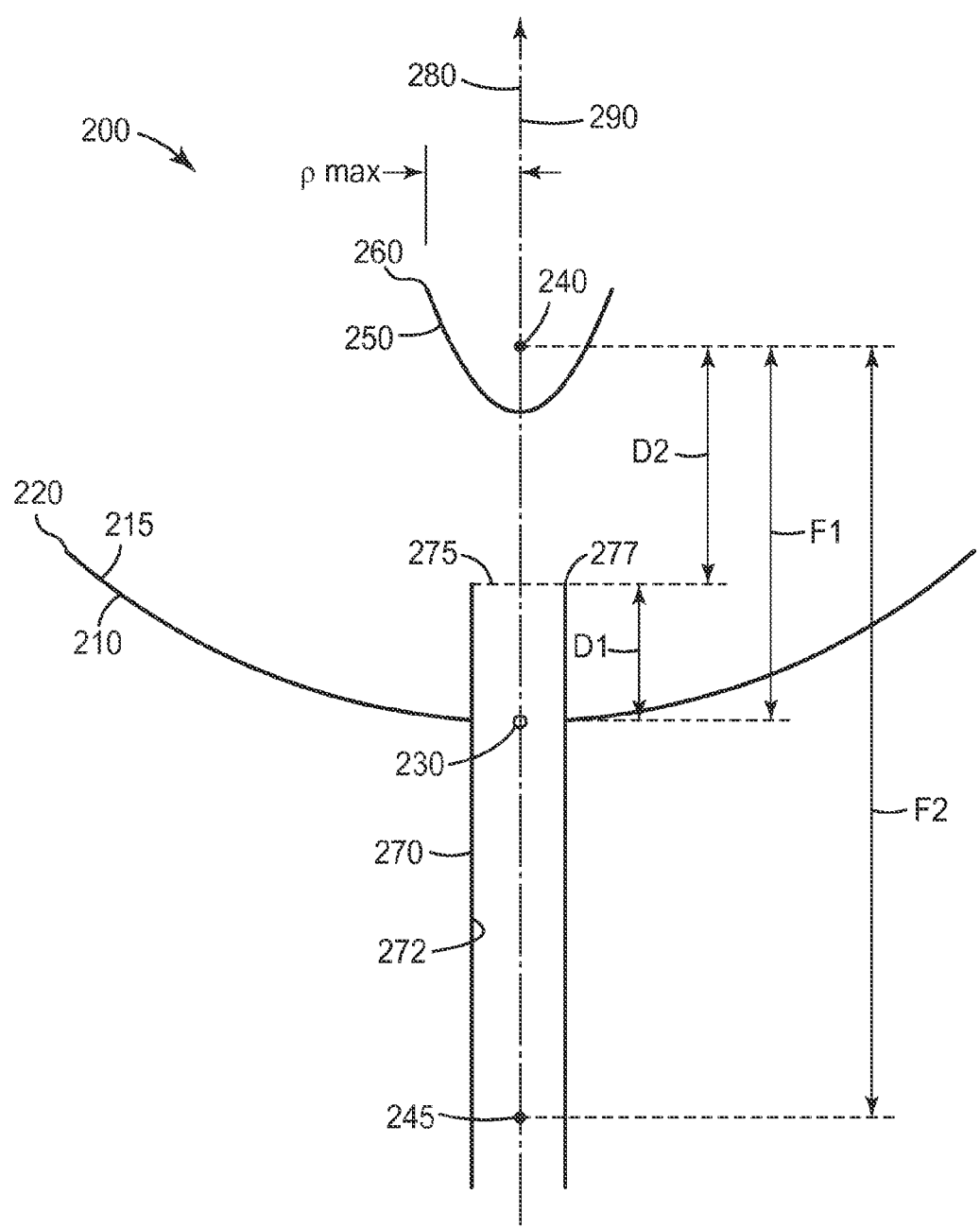
FIGS. 2A-2C show cross-sectional schematic views of a solar collector.
Figure 2B:
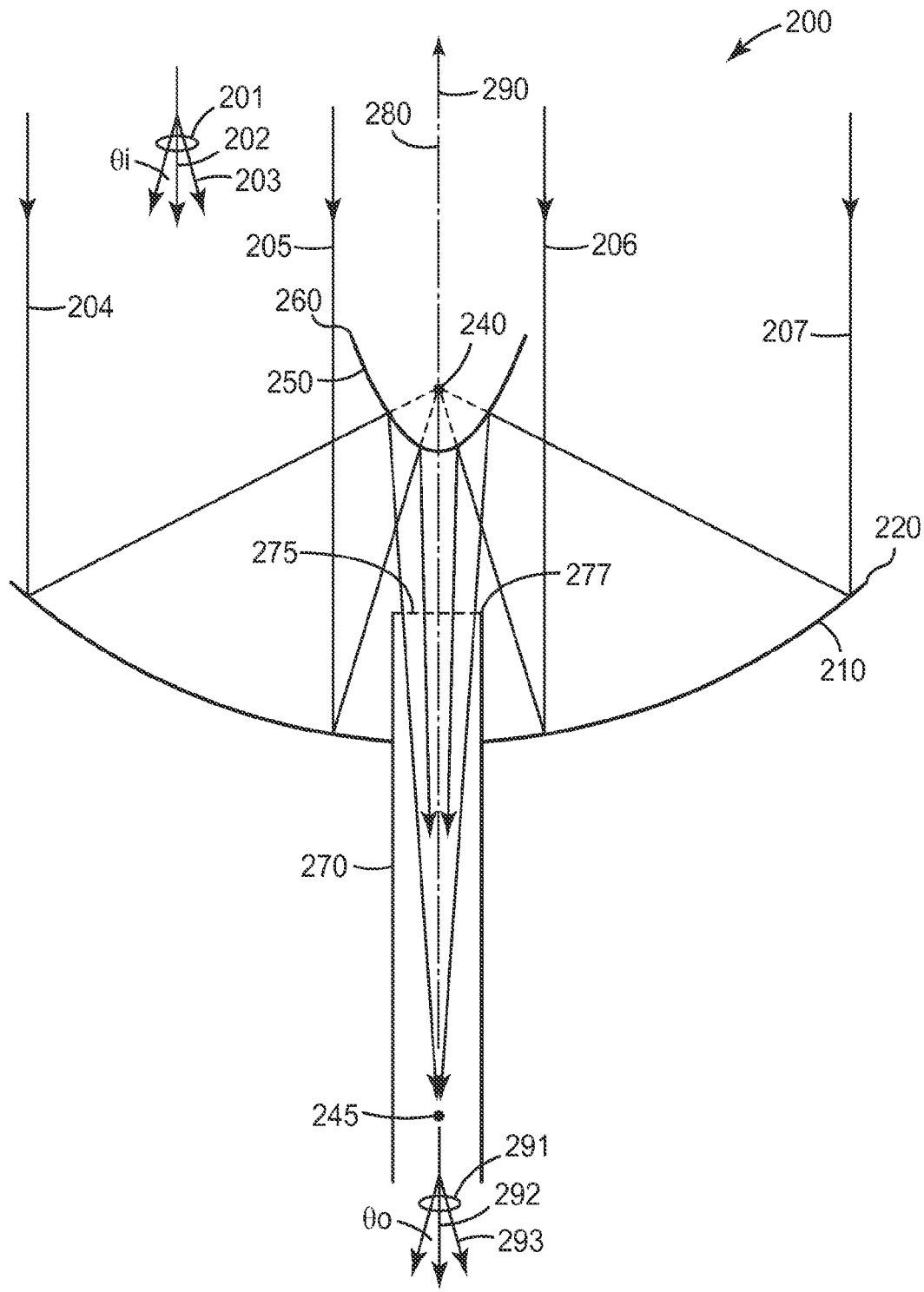
Figure 2C:
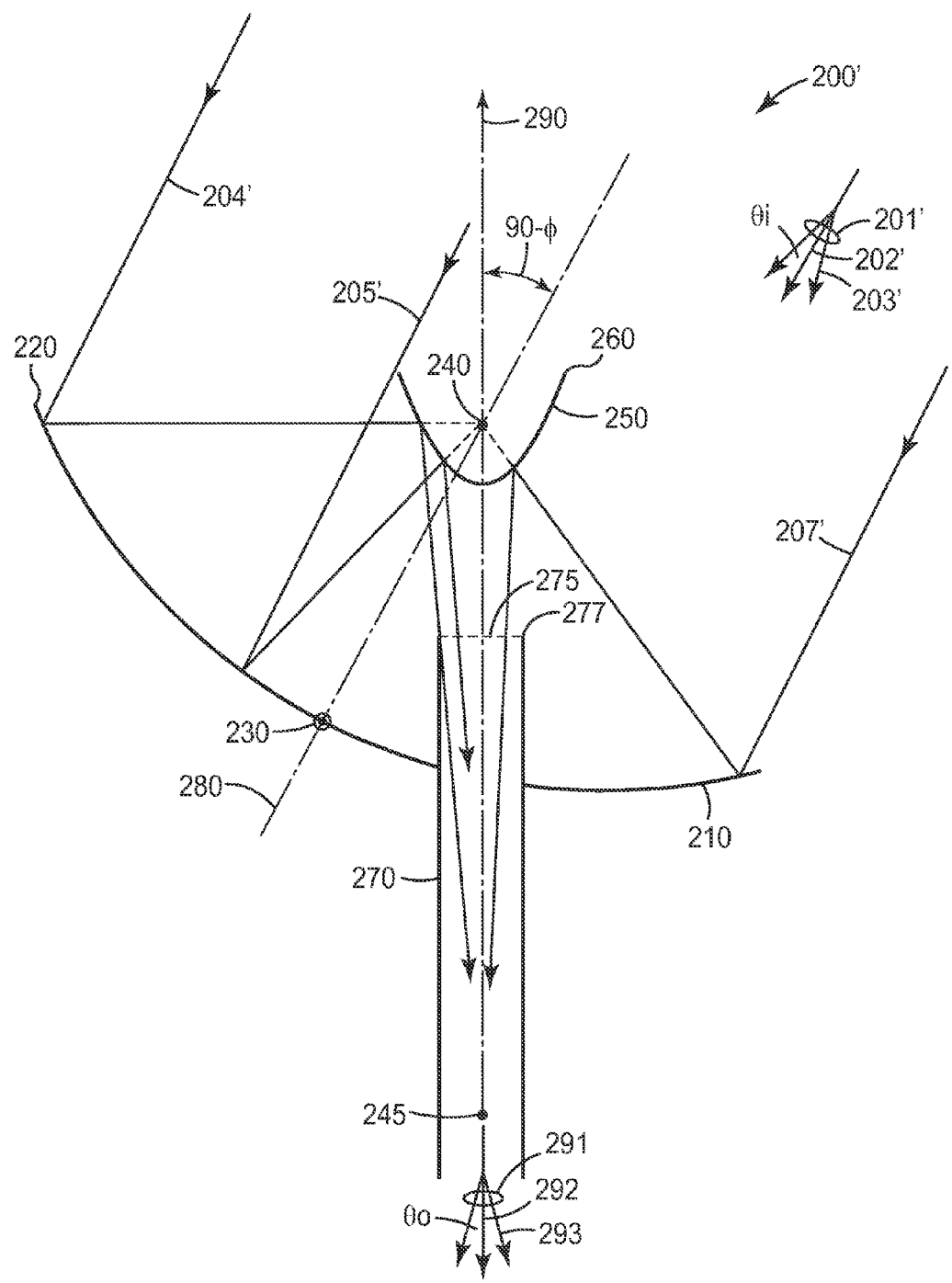

FIGS. 2A-2C show cross-sectional schematic views of a solar collector, according to one aspect of the disclosure. In FIG. 2A, solar collector 200 includes parabolic reflector 210 having first outer rim 220, a reflective surface 215, a vertex 230 and a parabolic focal point 240. A first axis 280 extends along a line between the vertex 230 and the parabolic focal point 240. An optional light duct 270 extends through the parabolic reflector 210, as described elsewhere. The optional light duct 270 includes an interior reflective surface 272 and an upper rim 277 that surrounds an entrance aperture 275. Solar collector 200 further includes a hyperbolic reflector 250 having a second outer rim 260, a first focal point coincident with the parabolic focal point 240, and a second focal point 245. A second axis 290 extends along a line that includes the parabolic focal point 240 and the second focal point 245. In one particular embodiment shown in FIG. 2A, the first axis 280 and the second axis 290 can be coincident; however, the embodiment shown in FIG. 2A can also include a view of solar collector 200 through a plane orthogonal to a plane containing the first axis 280 and second axis 290 for any general positioning on the collector shown in FIG. 1, in which case the first axis 280 and second axis 290 only appear to be coincident.

A first focal length "F1" of the parabolic reflector 210 is the distance between the vertex 230 and the parabolic focal point 240, and a second focal length "F2" of the hyperbolic reflector 250 is the distance between the parabolic focal point 240 and the second focal point 245. Generally, the relative magnitude of the first focal length "F1" and the second focal length "F2" can have any desired relationship, and can range from F1<F2, to F1=F2, even to F1>F2. The relative magnitude of F2 can be related to the extent of the collimation of light entering the optional light duct 270, as described elsewhere. In one particular embodiment, a larger second focal length F2 corresponds to a narrower collimation, that is, the light diverges within a smaller angle of the second axis 290.

The height "D1" of the entrance aperture 275 above the parabolic reflector 210 can range from a positive value (that is, the entrance aperture 275 is located between the parabolic reflector 210 and the hyperbolic reflector 250 as shown in the figure), to a negative value (that is, the entrance aperture 275 is located opposite the parabolic reflector 210 from the hyperbolic reflector 250, not shown). As the first axis 280 moves (for example, through an elevation angle such as elevation angle 185 shown in FIG. 1), the height "D1" above the parabolic reflector 210 will change. Generally, the entrance aperture 275 can be disposed anywhere along the second axis 290 such that light reflected from the hyperbolic reflector 250 and directed toward the second focal point 245 enters the optional light duct 270 through the entrance aperture 275. In one particular embodiment (shown), entrance aperture 275 is disposed between the parabolic reflector 210 and the hyperbolic reflector 250, and the second focal point 245 is disposed on the second axis 290 further from the parabolic focal point 240 than the parabolic reflector 210. The height "D2" of the parabolic focal point 240 above the entrance aperture 275 of the light duct 270 can also vary as desired, and can influence the geometry (for example, "$\rho_{max}$" the maximum width) of the hyperbolic reflector 250, as described elsewhere.

FIG. 2B shows a schematic cross-section tracing the paths of representative light rays entering solar collector 200, according to one aspect of the disclosure. Each of the elements 210-277 shown in FIG. 2B correspond to like-numbered elements shown in FIG. 2A, which have been described previously. An input light beam 201 from a source, such as the sun, includes a central light ray 202 travelling along the propagation direction, and boundary light rays 203 traveling within an input collimation angle θi of the central light ray 202. Each of the light rays 204, 205, 206, 207 entering solar collector 200 and travelling parallel to the first axis 280 within the input collimation angle θi, reflect from the parabolic reflector 210 and are directed toward the parabolic focal point 240. Each of the light rays 204, 205, 206, 207 then reflect from the hyperbolic reflector 250 and are directed toward the second focal point 245, as output light beam 291 having a central light ray 292 travelling in the propagation direction, and boundary light rays 293 travelling within an output collimation angle θo of the central light ray 292.

Relatively well-collimated light can be more effectively used in mirror-lined duct systems for transporting light. As the sunlight is concentrated, the collimation angle will increase from the input collimation half-angle of sunlight, about ¼ degree. Generally, the collimation half-angle θo of concentrated sunlight passing through the optional light duct 170 should be restricted to no greater than about 30 degrees, or no greater than about 25 degrees, or no greater than about 20 degrees. In one particular embodiment, the collimation angle θo can be about 23 degrees. The accuracy of tracking the sun, as well as the accuracy of the various optical components (for example, flatness and placement of reflective vanes, parabolic reflector shape, and hyperbolic reflector shape) all contributes to the resulting collimation angle θo. For example, the accuracy of rotation, tilt angle, and azimuth angle of the sun, can affect both the concentration ratio of input light area to output light area and output collimation half-angle θo.

FIG. 2C shows a schematic cross-section tracing the paths of representative light rays entering solar collector 200', according to one aspect of the disclosure. Each of the elements 210-277 shown in FIG. 2C correspond to like-numbered elements shown in FIG. 2A, which have been described previously. In FIG. 2C, the first axis 280 is tilted at an elevation angle φ from the horizontal (that is, angle (90-φ) from a vertically oriented second axis 290) toward the sun. An input light beam 201' from a source, such as the sun, includes a central light ray 202' travelling along the propagation direction, and boundary light rays 203' traveling within an input collimation angle θi of the central light ray 202'. Each of the light rays 204', 205', 207' entering solar collector 200' and travelling parallel to the first axis 280 within the input collimation angle θi, reflect from the parabolic reflector 210 and are directed toward the parabolic focal point 240. Each of the light rays 204', 205', 207' then reflect from the hyperbolic reflector 250 and are directed toward the second focal point 245, as output light beam 291 having a central light ray 292 travelling in the propagation direction, and boundary light rays 293 travelling within an output collimation angle θo of the central light ray 292.

Figure 3A:
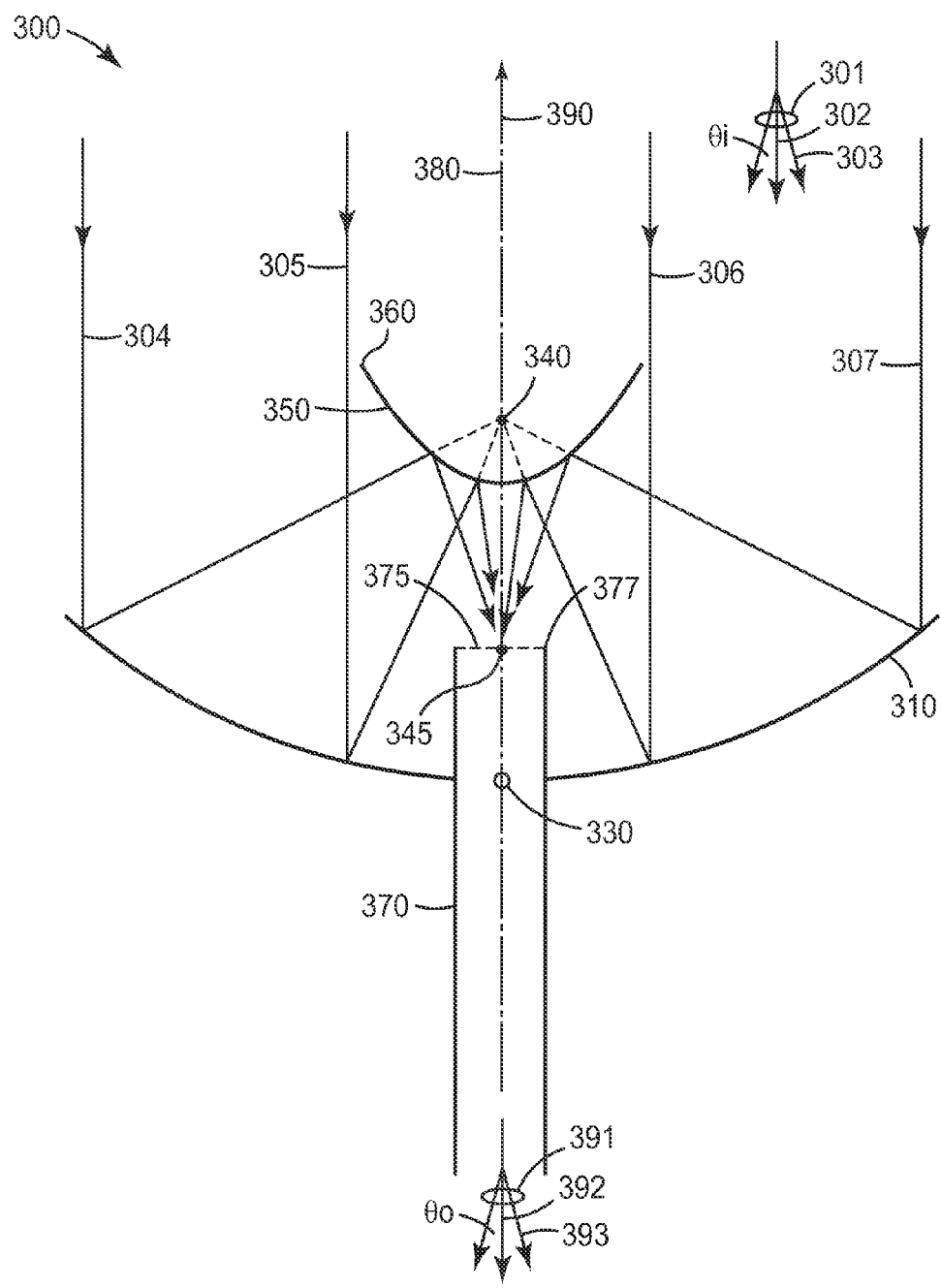
FIGS. 3A-3B shows cross sectional schematic views of a solar collector.

FIG. 3A shows a cross-sectional schematic view of a solar collector 300 according to one aspect of the disclosure. Each of the elements 310-393 shown in FIG. 3A correspond to like-numbered elements shown in FIG. 2A, which have been described previously. For example, parabolic reflector 310 in FIG. 3A corresponds to parabolic reflector 210 in FIG. 2A, and so on. In FIG. 3A, the relative positions of the second focal point 345 and the vertex 330 have been changed relative to the positions shown in FIG. 2A. Second focal point 345 is shown to be disposed between the vertex 330 and the first focal point 340, and within the entrance aperture 375 surrounded by upper rim 377 of the light duct 370.

Figure 3B:
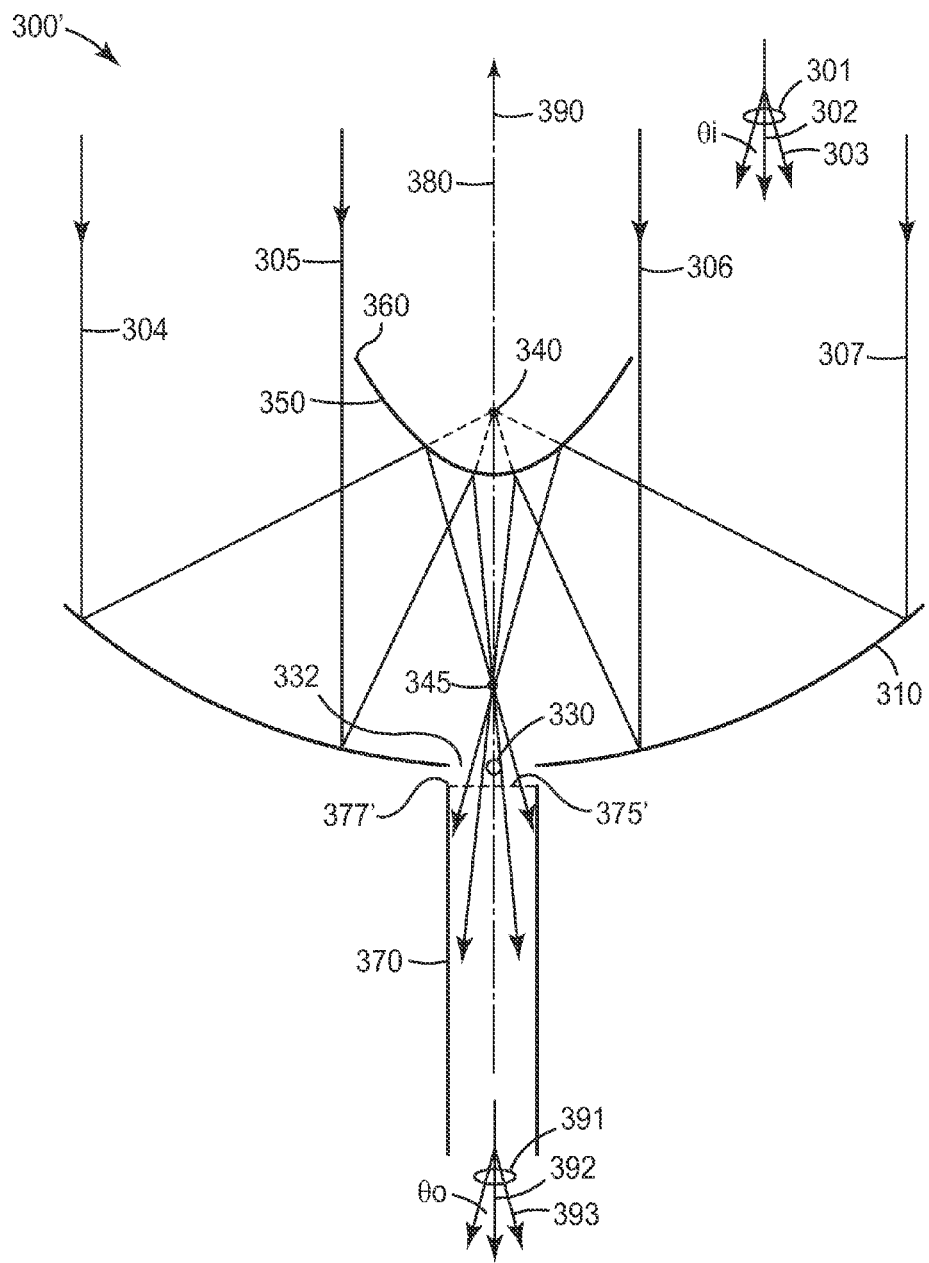

FIG. 3B shows a cross-sectional schematic view of a solar collector 300' according to one aspect of the disclosure. Each of the elements 310-393 shown in FIG. 3A correspond to like-numbered elements shown in FIG. 2A, which have been described previously. For example, parabolic reflector 310 in FIG. 3B corresponds to parabolic reflector 210 in FIG. 2A, and so on. In FIG. 3B, the relative positions of the second focal point 345 and the vertex 330 have been changed relative to the positions shown in FIG. 2A, and the upper rim 377' surrounding entrance aperture 375' of light duct 370 has been positioned on the other side of the vertex 330 from the second focal point 345. Second focal point 345 is still shown to be disposed between the vertex 330 and the first focal point 340, and light rays directed toward second focal point 345 enter light duct 370 through the entrance aperture 375'.

Figure 5:
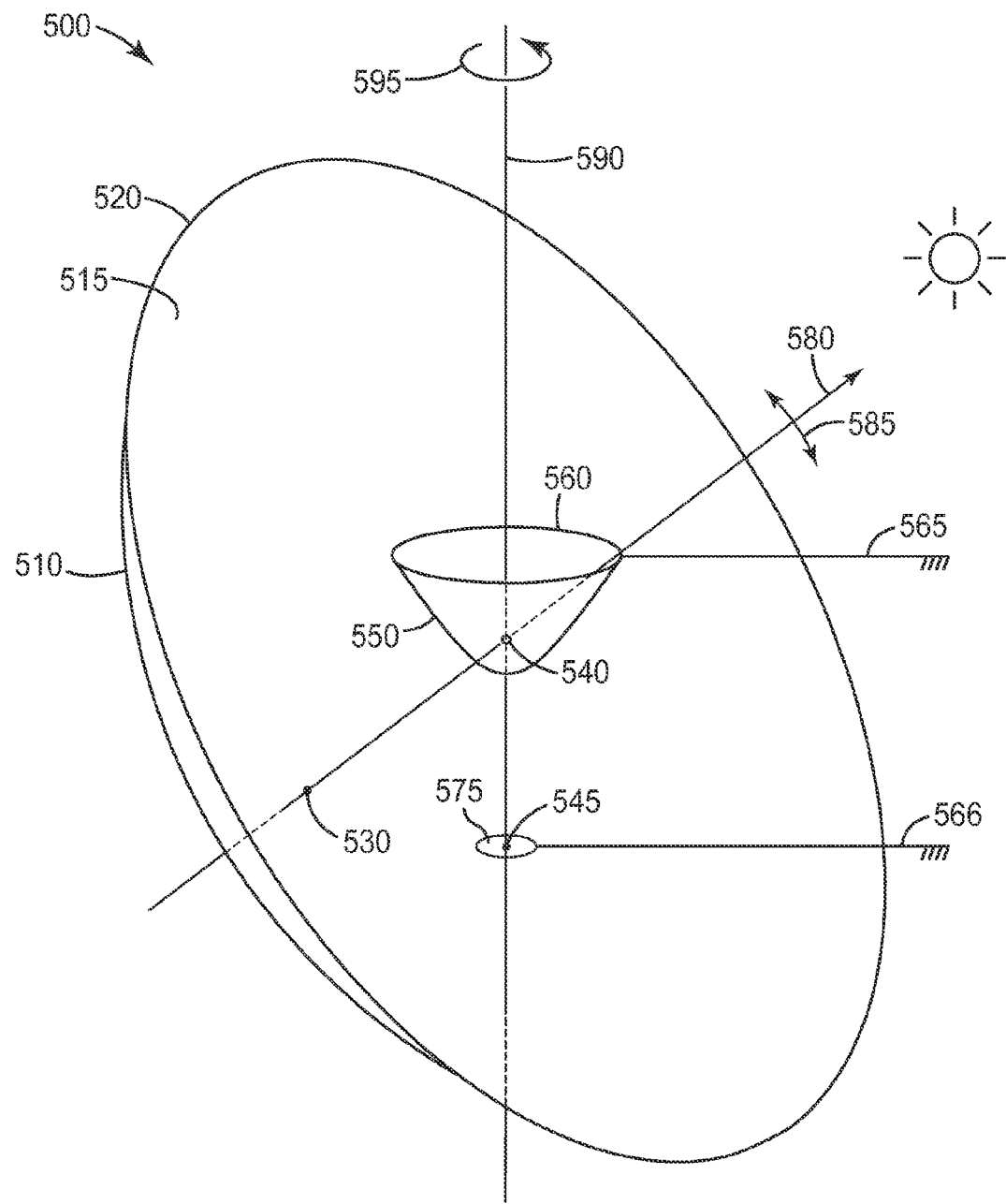
FIG. 5 shows a perspective view of a solar collector.

FIG. 5 shows a perspective view of a solar collector 500, according to one aspect of the disclosure. Each of the elements 510-590 shown in FIG. 5 correspond to like-numbered elements shown in FIG. 1, which have been described previously. For example, parabolic reflector 510 in FIG. 5 corresponds to parabolic reflector 110 in FIG. 1, and so on. In FIG. 5, the optional exit aperture 132 and the optional light duct 170 have been removed. The concentrated sunlight can be directed toward an energy conversion device 575 such as a photovoltaic device or a thermal conversion device, disposed near the second focal point 545. Each of the hyperbolic reflector 550 and the energy conversion device 575 can be affixed in position by first and second supports 565, 566, respectively. The first and second supports 565, 566, can arise from the same supporting structure (not shown), or from different supporting structures. In some cases, at least one of the first and second supports 565, 566, can be connected to the rotation 595 of parabolic reflector 510 about second axis 590. In some cases, at least one of the first and second supports 565, 566, can be fixed relative to the rotation 595 of parabolic reflector 510 about second axis 590.

Figure 6:
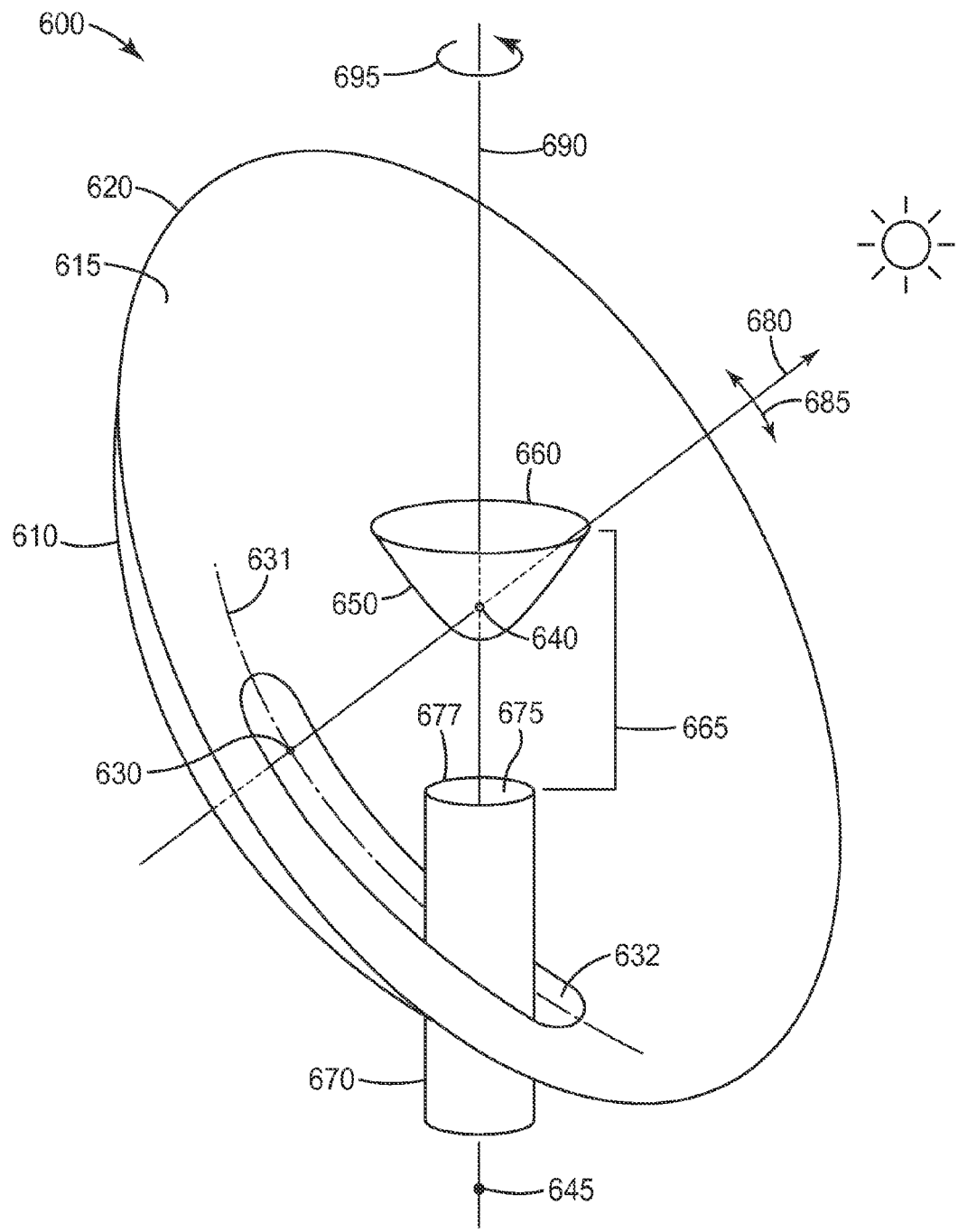
FIG. 6 shows a perspective view of a solar collector.

FIG. 6 shows a perspective view of a solar collector 600, according to one aspect of the disclosure. Each of the elements 610-690 shown in FIG. 6 correspond to like-numbered elements shown in FIG. 1, which have been described previously. For example, parabolic reflector 610 in FIG. 6 corresponds to parabolic reflector 110 in FIG. 1, and so on. In FIG. 6, the optional exit aperture 632 is disposed in the parabolic reflector 610, along a line 631 passing through the vertex 630 and lying in the plane that includes the vertex 630 and the second axis 690. In some cases, the optional exit aperture 632 can comprise a material that is transparent to solar radiation such as a polymer or a glass; in some cases, the optional exit aperture 632 can be a slot cut in the parabolic reflector 610. In one particular embodiment shown in FIG. 6, the optional exit aperture 632 extends along the line 631 between the vertex 630 and the first outer rim 620, without intersecting the first outer rim 620, such that any desired pivoting along the azimuthal direction 685 can be accommodated.

In one particular embodiment, as described elsewhere, the solar collector includes a large parabolic mirror and a small hyperbolic mirror. The paraboloid/hyperboloid collector possesses a circular exit aperture whose area relative to the aperture of the paraboloid specifies the concentration ratio of the collector.

In one particular embodiment, the first focus of the hyperboloid is coincident with the focus of the paraboloid, the second focus resides at the center of the exit aperture, and the diameter of the hyperboloid within the plane of the top surface of the base is equal to the diameter of the exit aperture. This configuration of mirrors is that of a Cassegrain telescope, and the fundamental optical functioning is the same as that of these telescopes.

For perfectly-collimated light incident parallel to the axis between the vertex and the parabolic focal point, all of the light crossing the top aperture of the parabolic mirror between the radius of the hyperbolic mirror and the radius of the parabolic mirror will be focused upon the center of the exit aperture. In a telescope, very-small deviations in the direction of incidence map in an orderly fashion to small deviations in the focus within the exit aperture. For the present concentrator, whatever deviations are present in the incidence from the solar disc result in displacements at the exit aperture that are less than the radius of this aperture. The implications of this relaxed requirement are substantial relaxation of the precision required in the fabrication and placement of the optical elements.

Manufactured mirrors might exhibit a variety of distortions relative to their ideal parabolic or hyperbolic forms. The magnitude and nature of these distortions will depend upon the materials and methods of manufacturing used. The impact of parabolic distortion will be less for lower concentration ratios and an inability to thermoform (or otherwise fabricate) to this precision will necessitate reduction of the targeted concentration ratio. Reduced concentration would require either smaller collector footprints (that is, fewer lumens collected) or larger exit apertures (that is, larger light-distribution ducts).

One of the challenges to implementing the off-axis cassegrain solar collector described herein is supporting the parabolic reflector and protecting the optical components from the elements. In some cases, the solar collector can further include a cylindrical-shaped housing, a rectangular-shaped housing, a spherical-shaped housing, a domed-shaped housing, or any suitable-shaped housing that can be positioned and rotated as described elsewhere. In some cases, the solar collector can instead have a fixed housing, and a support structure can be made to rotate beneath it. The housing can provide protection from the environment so that the solar collector is not damaged by wind, rain, hail, dust, debris, UV radiation that can degrade components, structural deformations that can degrade performance, and the like.

In one particular embodiment, a clear parabolic dome can be formed and then inverted and attached to the parabolic reflector, forming a double-parabola clamshell. The clear dome protects the reflective surfaces within the collector, can provide significant structural reinforcement, and can be inexpensively produced since it can use the same tooling used to produce the reflective parabolic surface. In some cases, the double-parabola clamshell can include a support ring, for example, aluminum or other rigid material formed into a ring surrounding the joined outer rims of the paraboloids. In some cases, each of the paraboloids of the double-parabola clamshell can include a flange that extends from the outer rim, such that the the two paraboloids can be attached by abutting the flanges together.

In another embodiment, a large dome can cover the entire solar collector. Such a dome could protect the collector from the elements. Preferably, all visible-light transparent portions of the dome would be made from a UV blocking/absorbing material, and the dome would likely add significant cost, and increase the physical footprint and size of the solar collector.

In some cases, the solar collector system can also include a technique of covering the aperture or slot in the parabolic mirror. In some cases, the slot can be covered by a flexible boot (that is, a flexible or deformable member that is attached to the bottom of the parabola as well as the base plate or inlet duct). In some cases, if the inlet duct does not penetrate the parabolic mirror, the slot can be simply a transparent section which allows the light to pass through and enter the duct. This embodiment could also add significant strength to the parabola, but may require an alternate method of holding the hyperbolic optic, or an energy conversion device such as a photovoltaic cell or thermal energy conversion device.

Figure 7A:
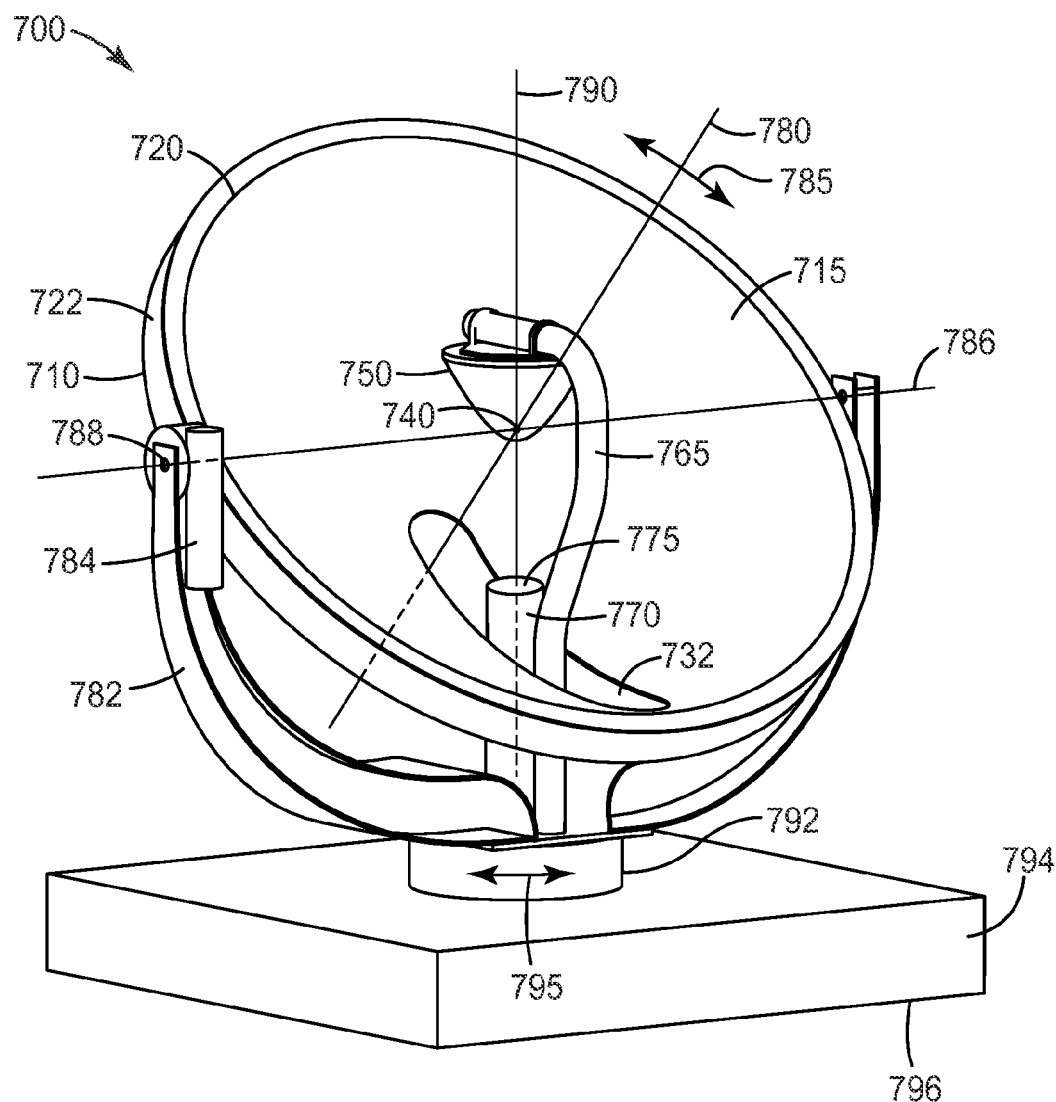
FIG. 7A shows a perspective view of a solar collector.

FIG. 7A shows a perspective view of a solar collector 700, according to one aspect of the disclosure. Each of the elements 710-795 shown in FIG. 7A correspond to like-numbered elements shown in FIG. 1, which have been described previously. For example, parabolic reflector 710 in FIG. 7A corresponds to parabolic reflector 110 in FIG. 1, and so on. Solar collector 700 further includes one particular embodiment of structures and mechanisms that can be used to effectively track the sun during operation of the solar collector 700.

Solar collector 700 includes a parabolic reflector 710 having an interior reflective surface 715 and a first outer rim 720. An optional support ring 722 can be affixed to the outer rim 720 to provide resistance to deformation of the parabolic reflector 710 due to movement, winds, and the like. The parabolic reflector 710 has a geometry that can be characterized by a parabolic focal point 740, and a first axis 780 extending between the vertex (not shown) and parabolic focal point 740. Solar collector 700 further includes a hyperbolic reflector 750 and a first focal point coincident with the parabolic focal point 740. A second axis 790 extends along a line that includes the parabolic focal point 740 and the second focal point (not shown) of the hyperbolic reflector 750.

In one particular embodiment, second axis 790 can be pointed toward the zenith (that is, perpendicular to the horizontal); however, in other embodiments, second axis 790 can be pointed instead at any desired angle or orientation to the zenith. For example, the second axis 790 of the solar collector 700 can be directed toward the horizontal for a building side mounted collector. A tilt angle of the second axis 790 can depend upon the placement of the solar collector 700, including, for example, latitude, unobstructed view, duration and times for optimum daylighting, and the like, as described elsewhere. First axis 780 is capable of rotating about the second axis 790 along an azimuthal direction 795, without movement of the second axis 790. First axis 780 is also capable of rotating along an elevation direction 785 that pivots around the parabolic focal point 740. In one particular embodiment, first axis 780 can be positioned toward the sun, such that solar radiation incident upon the parabolic reflector 710 and reflecting from the hyperbolic reflector 750, propagates within an output collimation angle of the second axis 790, as described elsewhere.

Exit aperture 732 can be disposed in the parabolic reflector 710 as described elsewhere, and as shown in FIG. 7A, is a slot 732 cut in the parabolic reflector 710. A light duct 770 is disposed along the second axis 790, and extends through the slot 732 of the parabolic reflector 710 as shown. A support structure 765 affixes hyperbolic reflector 750 to light duct 770, such that the parabolic focal point 740 and the second axis 790 remain fixed and do not move. In some cases, shown in FIG. 7A, support structure 765 affixes hyperbolic reflector 750 to one axis of rotation of the parabolic reflector 710 such that the hyperbolic reflector 750 can rotate about the second axis 790, as described elsewhere. The light duct 770 includes an entrance aperture 775 positioned such that light reflected from the hyperbolic reflector 750 enters light duct 770 through entrance aperture 775 and is directed toward second focal point (not shown) of hyperbolic reflector 750. Light duct 770 can be a portion of a light distribution system (not shown) used for daylight distribution system for architectural lighting.

Solar collector 700 includes a base 794 that has a bottom surface 796 that can be affixed to a building structure (not shown) such as a roof or side of a building. The parabolic reflector 710 is supported by supporting arm 782 through pivot points 788 and optional support ring 722, and can be rotated relative to the first axis 790 by a motor 784. A pivot line 786 through pivot points 788 also passes through parabolic focal point 740 such that any rotation of first axis 780 along elevation direction 785 does not change the relative position of the parabolic focal point 740. A rotating support 792 affixed to the base 794 rotates parabolic reflector 710 along an azimuthal direction 795 about second axis 790, again without changing the relative position of the parabolic focal point 740.

Figure 7B:
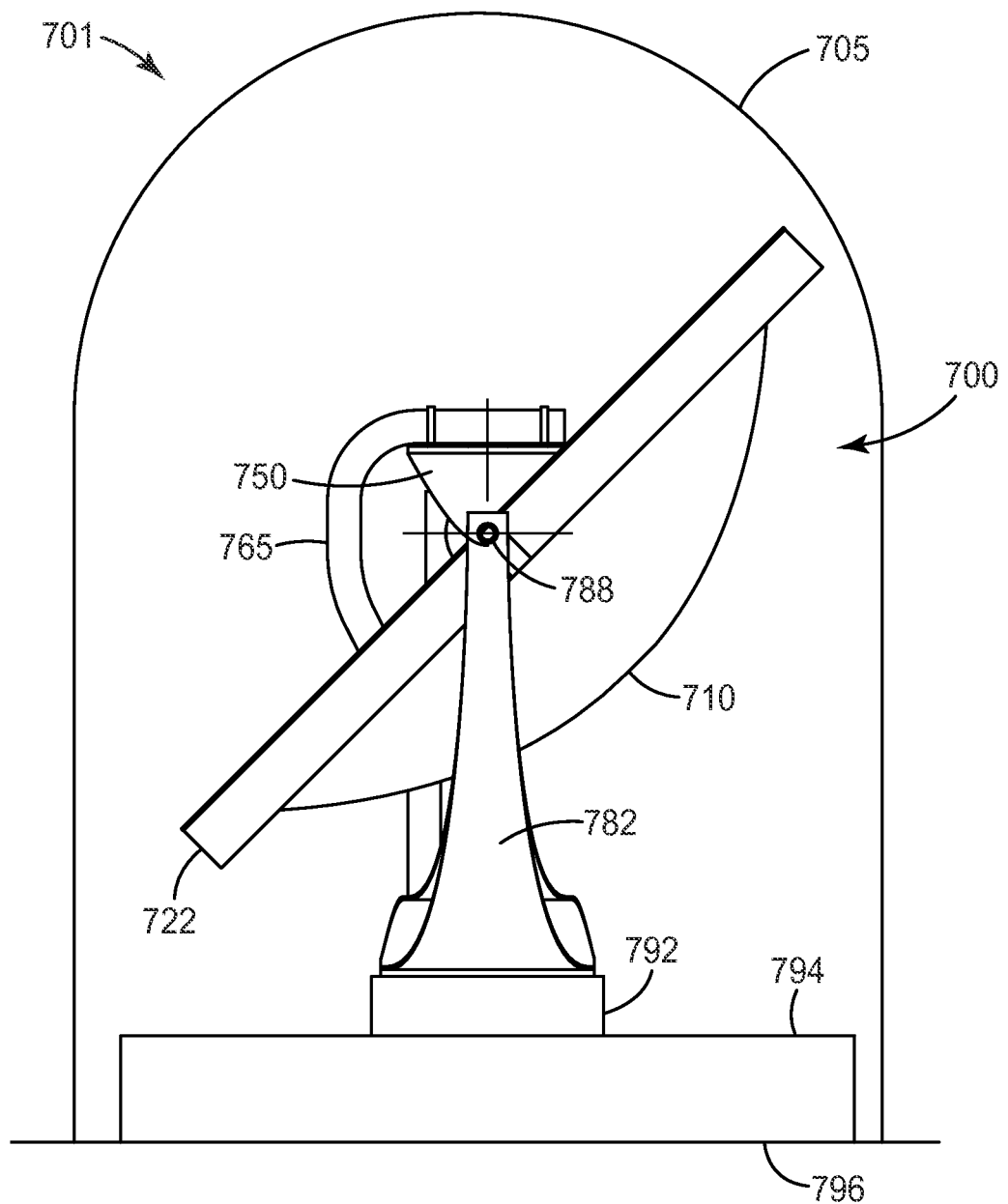
FIG. 7B shows a side view of a protected solar collector.

FIG. 7B shows a side view of a protected solar collector 701, according to one aspect of the disclosure. Each of the elements 700-796 shown in FIG. 7B correspond to like-numbered elements shown in FIG. 7A, which have been described previously. For example, parabolic reflector 710 in FIG. 7B corresponds to parabolic reflector 710 in FIG. 7A, and so on. In FIG. 7B, protected solar collector 701 includes solar collector 700 of FIG. 7A and a visible-light transparent dome 705 disposed over solar collector 700, provided as protection from the elements. Visible-light transparent dome 705 can protect the entire solar collector 700 by being affixed to the same building surface as base 794 as shown, or may be affixed to some portion of the fixed base 794, or instead it may be affixed to the rotating support 792. The visible-light transparent dome 705 need only be transparent to visible-light where the solar collector 700 is directed toward the sun for sunlight collection, and may be fabricated from opaque materials in other regions. It is to be understood that the visible-light transparent dome can be any desired shape or size necessary to accommodate motion and orientation of solar collector 700, including spherical based domes, cylindrical based domes, polygonal based domes, and even structures that include other planar or curved surfaces that provide the desired protection from the elements without unduly reducing the efficiency of solar collection or interfering with the motion of solar collector 700.

Figure 7C:
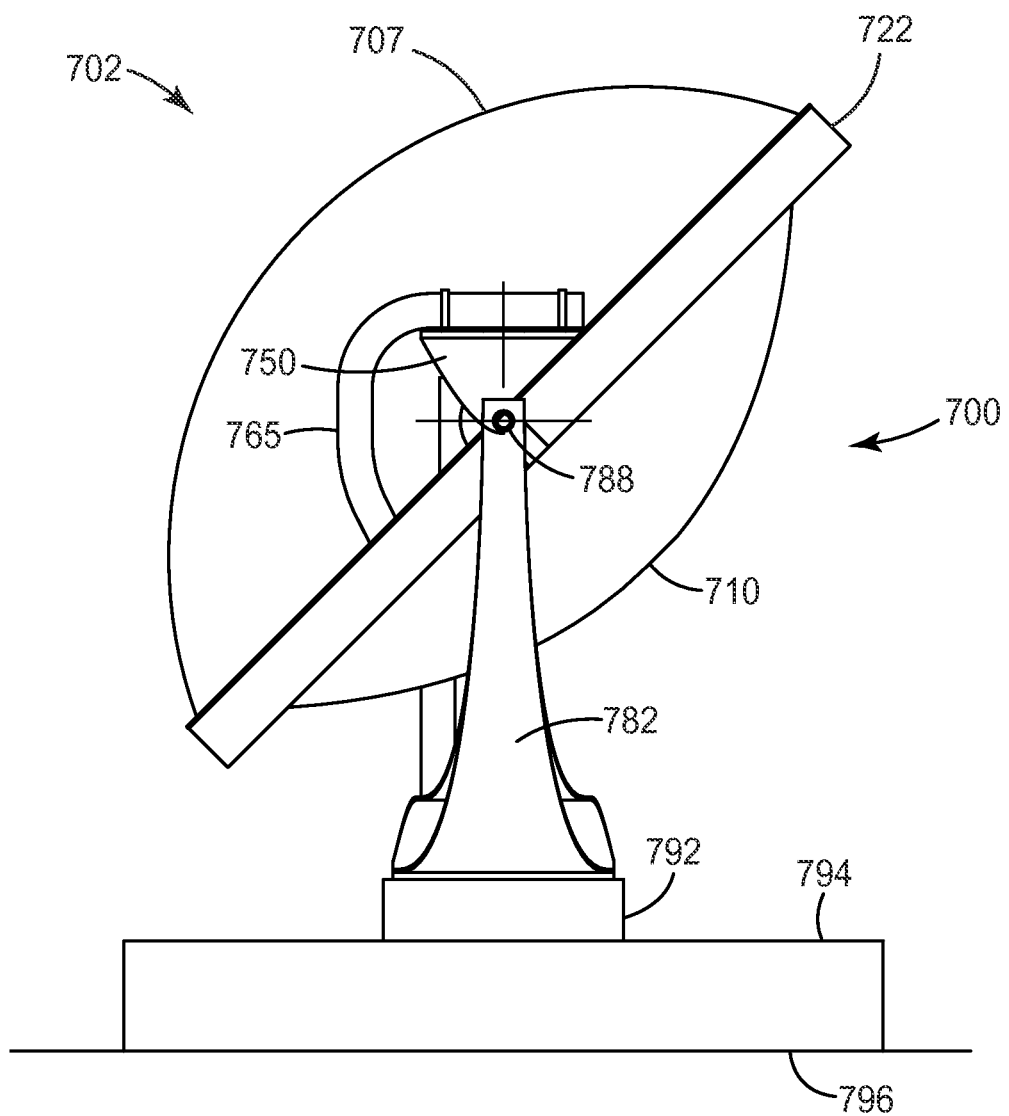
FIG. 7C shows a side view of a protected solar collector.

FIG. 7C shows a side view of a protected solar collector 702, according to one aspect of the disclosure. Each of the elements 700-796 shown in FIG. 7C correspond to like-numbered elements shown in FIG. 7A, which have been described previously. For example, parabolic reflector 710 in FIG. 7C corresponds to parabolic reflector 710 in FIG. 7A, and so on. In FIG. 7C, protected solar collector 702 includes solar collector 700 of FIG. 7A and a visible-light transparent dome 707 disposed over the parabolic reflector 710 of solar collector 700 in a clamshell configuration, provided as protection from the elements. Visible-light transparent dome 707 can protect the optical components of solar collector 700 including, for example, parabolic reflector 710, hyperbolic reflector 750, and light duct 770 (not shown).

It is to be understood that the visible-light transparent dome 707 can be any desired shape or size necessary to accommodate motion and orientation of solar collector 700, including spherical based domes, cylindrical based domes, polygonal based domes, and even structures that include other planar or curved surfaces that provide the desired protection from the elements without unduly reducing the efficiency of solar collection or interfering with the motion of solar collector 700. In one particular embodiment, the visible-light transparent dome 707 can be fabricated in the same parabolic shape using the same (or similar) tooling as the parabolic reflector 710. In some cases, the visible-light transparent dome 707 can be affixed to the parabolic reflector 710 using a support ring 722, as shown. In some cases, each of the visible-light transparent dome 707 and the parabolic reflector 710 can further include a flange (not shown) that extends from the outer rim 720 of each parabolic form, and the two flanges can be affixed together forming the clamshell configuration.

Figure 7D:
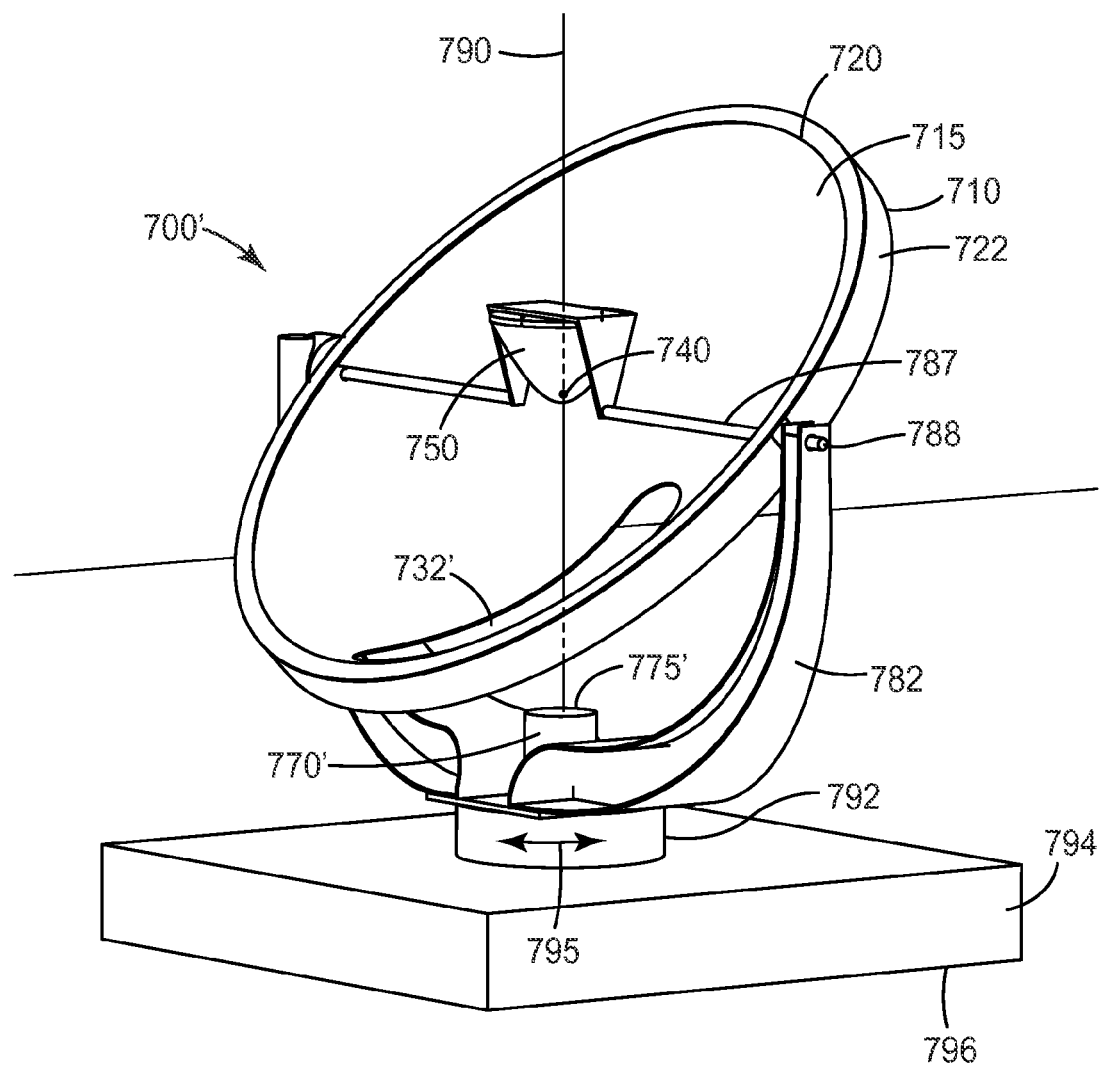
FIG. 7D shows a perspective view of a solar collector.

FIG. 7D shows a perspective view of a solar collector 700', according to one aspect of the disclosure. Each of the elements 710-796 shown in FIG. 7D correspond to like-numbered elements shown in FIG. 7A, which have been described previously. For example, parabolic reflector 710 in FIG. 7D corresponds to parabolic reflector 710 in FIG. 7A, and so on. Solar collector 700' further includes one particular embodiment of structures and mechanisms that can be used to effectively track the sun during operation of the solar collector 700'.

Exit aperture 732' can be disposed in the parabolic reflector 710 as described elsewhere, and as shown in FIG. 7D, is a visible-light transparent window 732' disposed in the parabolic reflector 710. A light duct 770' is disposed along the second axis 790, and does not extend through the visible-light transparent window 732' of the parabolic reflector 710, as shown. A support structure 787 affixes hyperbolic reflector 750 to parabolic reflector support 782 through pivot points 788, such that the hyperbolic reflector 750, the parabolic focal point 740, and the second axis 790 remain fixed and do not move as the parabolic reflector 710 rotates to different elevation angles.

In some cases, the visible-light transparent window 732' can be an open slot in parabolic reflector 710, as described elsewhere. In one particular embodiment, visible-light transparent window 732' can instead be a solid portion of parabolic reflector 710 that does not have a reflective surface 715. In some cases, the reflective surface 715 can be removed from the area of the visible-light transparent window 732', such as by etching a metallic reflector or removal of an adhered film reflector. In some cases, application of the reflective surface 715 can be eliminated from the region of the visible-light transparent window 732'. In can be preferable to have the visible-light transparent window 732' be a solid, transparent, and contiguous portion of parabolic reflector 710.

The light duct 770' includes an entrance aperture 775' positioned such that light reflected from the hyperbolic reflector 750 enters light duct 770' through entrance aperture 775' and is directed toward second focal point (not shown) of hyperbolic reflector 750. Light duct 770' can be a portion of a light distribution system (not shown) used for daylight distribution system for architectural lighting.

Solar collector 700' includes a base 794 that has a bottom surface 796 that can be affixed to a building structure (not shown) such as a roof or side of a building. The parabolic reflector 710 is supported by supporting arm 782 through pivot points 788 and optional support ring 722, and can be rotated relative to the first axis 790 by a motor (not shown). A rotating support 792 affixed to the base 794 rotates parabolic reflector 710 along an azimuthal direction 795 about second axis 790, without changing the relative position of the parabolic focal point 740.

Solar collector 700' can be protected from the elements using any of the techniques described elsewhere for solar collector 700, and also as shown in FIG. 7B and FIG. 7C. In some cases, the configuration of solar collector 700' can provide superior protection from the elements since both the parabolic reflector 710 and hyperbolic reflector 750 can be protected from contamination through the open slot 732 shown in solar collector 700.

Following are a list of embodiments of the present disclosure.

Item 1 is a solar collector, comprising: a parabolic reflector having a vertex, a parabolic focal point, and a first axis therebetween; and a hyperbolic reflector having a first focal point coincident with the parabolic focal point, a second focal point, and a second axis including the first and second focal points; wherein the first axis can be aligned at an elevation angle and an azimuth angle without movement of the second axis, such that solar radiation incident upon the parabolic reflector and reflecting from the hyperbolic reflector, propagates within an output collimation angle of the second axis.

Item 2 is the solar collector of item 1, wherein the hyperbolic reflector is affixed to the parabolic reflector such that the hyperbolic reflector and the first axis collectively rotate around the second axis, as the first axis is aligned to the azimuth angle.

Item 3 is the solar collector of item 1 or item 2, wherein the hyperbolic reflector remains stationary as the first axis is aligned to the azimuth angle.

Item 4 is the solar collector of item 1 to item 3, further comprising an exit aperture disposed in the parabolic reflector, along a line passing through the vertex of the parabolic reflector.

Item 5 is the solar collector of item 1 to item 4, wherein the exit aperture comprises a slot that extends to a rim of the parabolic reflector.

Item 6 is the solar collector of item 1 to item 5, wherein the exit aperture comprises a material that is transparent to solar radiation.

Item 7 is the solar collector of item 1 to item 6, further comprising a light duct disposed along the second axis and capable of accepting solar radiation propagating within the output collimation angle of the second axis.

Item 8 is the solar collector of item 1 to item 7, wherein the light duct is a hollow reflective light duct having an input aperture.

Item 9 is the solar collector of item 7 or item 8, wherein the light duct includes an input aperture disposed proximate the second focal point.

Item 10 is a solar collector, comprising: a parabolic reflector having a vertex, a parabolic focal point, and a first axis therebetween; a hyperbolic reflector having a first focal point coincident with the parabolic focal point, a second focal point, and a second axis including the first and second focal points; an exit aperture disposed in the parabolic reflector and on a plane defined by the first and second axis; and a light duct disposed along the second axis; wherein the first axis can be aligned at an elevation angle and an azimuth angle without movement of the hyperbolic reflector or the light duct.

Item 11 is the solar collector of item 10, wherein the exit aperture comprises a slot that extends to a rim of the parabolic reflector.

Item 12 is the solar collector of item 10 or item 11, wherein the exit aperture comprises a material that is transparent to solar radiation.

Item 13 is the solar collector of item 10 to item 12, wherein the second focal point is proximate an input aperture of the light duct.

Item 14 is the solar collector of item 10 to item 13, wherein the second focal point is within the light duct.

Item 15 is the solar collector of item 10 to item 14, wherein the light duct extends through the exit aperture.

Item 16 is the solar collector of item 10 to item 15, wherein the hyperbolic reflector is affixed to the light duct.

Item 17 is the solar collector of item 10 to item 16, wherein the first axis is aligned toward the sun.

Item 18 is the solar collector of item 10 to item 17, wherein the light duct comprises a reflective hollow light duct.

Item 19 is the solar collector of item 10 to item 18, wherein an input light ray within a first collimation half-angle of the first axis reflects from the parabolic reflector, reflects from the hyperbolic reflector, and is directed into the light duct within a second collimation half-angle of the second axis.

Item 20 is the solar collector of item 19, wherein for a first collimation half-angle of about 0.25 degrees, the second collimation half-angle comprises an angle up to about 30 degrees.

Item 21 is a solar collector, comprising: a parabolic reflector having a vertex, a parabolic focal point, and a first axis therebetween; a hyperbolic reflector having a first focal point coincident with the parabolic focal point, a second focal point, and a second axis including the first and second focal points; an exit aperture disposed in the parabolic reflector and on a plane defined by the first and second axis; and a light duct disposed along the second axis; wherein the first axis can be aligned at an elevation angle and an azimuth angle, and at least one of the hyperbolic reflector and the light duct rotates around the second axis.

Item 22 is the solar collector of item 21, wherein the exit aperture comprises a slot that extends to a rim of the parabolic reflector.

Item 23 is the solar collector of item 21 or item 22, wherein the exit aperture comprises a material that is transparent to solar radiation.

Item 24 is the solar collector of item 21 to item 23, wherein the second focal point is proximate an input aperture of the light duct.

Item 25 is the solar collector of item 21 to item 24, wherein the second focal point is within the light duct.

Item 26 is the solar collector of item 21 to item 25, wherein the light duct extends through the exit aperture. Item 27 is the solar collector of item 21 to item 26, wherein the hyperbolic reflector is affixed to the light duct.

Item 28 is the solar collector of item 21 to item 27, wherein the hyperbolic reflector is affixed to the parabolic reflector such that the hyperbolic reflector and the first axis collectively rotate around the second axis, as the first axis is aligned to the azimuth angle.

Item 29 is the solar collector of item 21 to item 28, wherein the light duct is affixed to the parabolic reflector such that the light duct and the first axis collectively rotate around the second axis, as the first axis is aligned to the azimuth angle.

Item 30 is the solar collector of item 21 to item 29, wherein the first axis is aligned toward the sun.

Item 31 is the solar collector of item 21 to item 30, wherein the light duct comprises a reflective hollow light duct.

Item 32 is the solar collector of item 21 to item 31, wherein an input light ray within a first collimation half-angle of the first axis reflects from the parabolic reflector, reflects from the hyperbolic reflector, and is directed into the light duct within a second collimation half-angle of the second axis.

Item 33 is the solar collector of item 32, wherein for the first collimation half-angle of about 0.25 degrees, the second collimation half-angle comprises an angle up to about 30 degrees.

Item 34 is a solar collector, comprising: a parabolic reflector having a vertex, a parabolic focal point, and a first axis therebetween; a hyperbolic reflector having a first focal point coincident with the parabolic focal point, a second focal point, and a second axis including the first and second focal points; a slot disposed in the parabolic reflector and on a plane defined by the first and second axis; and a hollow reflective light duct disposed along the second axis and extending through the slot; wherein the parabolic reflector can be rotated such that the first axis is aligned to the sun at an elevation angle and an azimuth angle without movement of the second axis, such that solar radiation incident upon the parabolic reflector and reflecting from the hyperbolic reflector enters the hollow reflective light duct and propagates within an output collimation angle of the second axis.

Item 35 is an architectural lighting system comprising the solar collector of item 1 to item 34.

Item 36 is the architectural lighting system of item 35, further comprising light distribution ducts.

Item 37 is the architectural lighting system of item 35, further comprising an electrical light source capable of injecting light into the light distribution ducts.

Item 38 is the architectural lighting system of item 35 to 37, further comprising a protective housing.

Item 39 is the architectural lighting system of item 38, wherein the protective housing comprises a visible-light transparent dome at least partially surrounding the solar collector.

Item 40 is the architectural lighting system of item 38 or item 39, wherein the protective housing comprises a visible-light transparent dome affixed to the parabolic reflector in a clamshell configuration.

Item 41 is the architectural lighting system of item 40, wherein the visible-light transparent dome comprises a paraboloid.

Item 42 is the architectural lighting system of item 40 or item 41, further comprising a support ring disposed adjacent the parabolic reflector and visible-light transparent dome.

EXAMPLES

Figure 4:
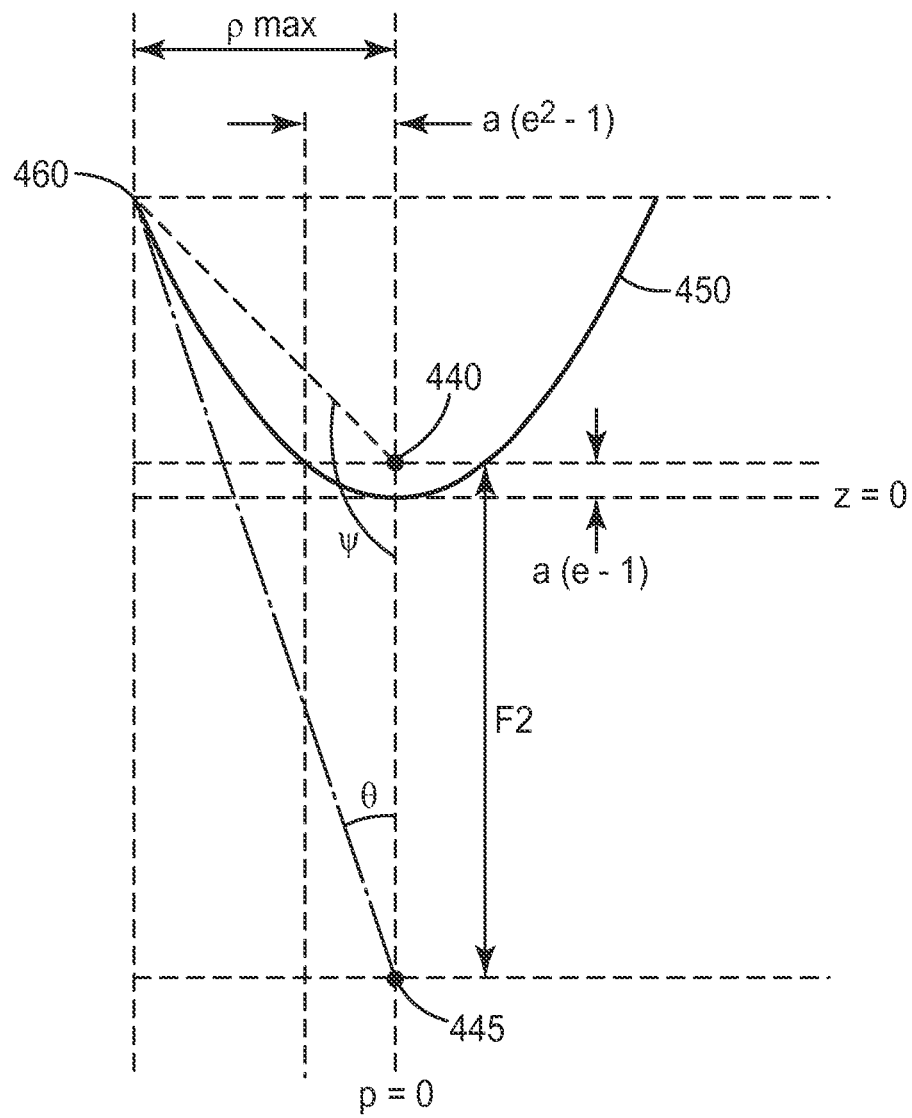
FIG. 4 shows parameters associated with a solar collector.

FIG. 4 shows parameters associated with a solar collector hyperboloid 450, according to one aspect of the disclosure.

The hyperboloid 450 can be any of the hyperbolic reflectors (150, 250, 350, 550, 650) shown in FIGS. 1-6. Parameters of the solar collector that are not shown in FIG. 4 include: the diameter and focal length of the parabolic mirror, the width of the slot (that is, exit aperture) in the parabola, and the reflectivity of this mirror; reflectivity of the hyperbolic mirror; and the diameter and interior reflectivity of the duct and the vertical position of its entrance aperture. The slot allows the optical axis of the parabola to point anywhere between the horizon (0° solar elevation) and the zenith (90° solar elevation). Rotation of the parabola about the centerline of the duct to track the solar azimuth results in no change in either the configuration or the optical performance of the collector.

The collection capabilities of this and other example designs have been evaluated via ray-trace simulation. It is generally understood that the greatest challenge in the fabrication of large Cassegrain optics is the precision of the parabolic mirror. In recognition of this challenge our simulations include a parametric random dither in the direction of rays as they are reflected from the parabola. The dither is characterized by the half angle of a cone of directions uniformly and randomly filled about the exact specular direction. Laser characterizations of trial 60-inch (1.524 m) diameter thermoformed mirrors indicate the possibility of half angles as small as 0.50 degrees. Unless otherwise stated, all simulation results include the effects of a 0.50 degree dither, as well as the 0.25 degree divergence angle of direct solar luminance.

The parameters associated with the example include (with reference to FIG. 1 and FIG. 2A): a 60 inch (1.524 m) diameter parabolic reflector 110 made from a thermoformed Enhanced Specular Reflective film R=0.98 (Vikuiti™ ESR film, available from 3M Company), 15 inch (38.1 cm) focal length F1 (resulting in f/0.25), 0.50 degree reflective dither, and a 6 inch (15.24 cm) wide exit aperture 132. The light duct was a 6 inch (15.24 cm) diameter ESR-lined duct having an entrance aperture 175 positioned at the second focal point 145, similar to the configuration shown in FIG. 3A.

As shown in FIG. 4, the hyperbolic reflector 450 was 12 inch (30.48 cm) in diameter (that is, $\rho_{max}$=6 inches (15.24 cm)). The focal separation F2 between parabolic focal point 440 and second hyperbolic focal point 445, was 10 inches (25.4 cm), with ψ=135 degrees. The hyperbola was modeled to be metallic, with reflectivity R=0.95. The equation of the hyperbolic surface used in the example can be given by:

$$\rho^2 = b^2 \left( \frac{(z+a)^2}{a^2} - 1 \right)$$

for which, given the parameters $\rho_{max}$, F2, and ψ:

$$e = \frac{\sqrt{\cot^2\psi + 1}\left(\frac{\rho_{max}}{F2}\right) + \sqrt{\left(\left(\frac{\rho_{max}}{F2}\right)^2 + \left(1 + \cot\psi\left(\frac{\rho_{max}}{F2}\right)\right)^2\right)}}{1 - 2\cot\psi\left(\frac{\rho_{max}}{F2}\right)}$$

$$a = \frac{F2}{2e}$$

$$b = a\sqrt{e^2 - 1}$$

Solar elevation is the most significant predictable operational factor affecting the collector's performance (whereas unpredictable operational factors include, for example, cloud cover and haze). The fraction of light reflected from the parabola which approaches the common focus of the parabola and hyperbola within the acceptance angle of the hyperbola (for example, 135 degrees) increases with increasing solar elevation. Neglecting solar divergence and parabolic dither, all of the light will be within the acceptance angle for solar elevations greater than 45 degrees. Somewhat diminished efficiencies occur near sunrise and sunset, and near-maximal efficiency from mid morning to mid afternoon. The pattern of diminished efficiency near the beginning and end of the day conveniently matches human expectations conditioned by diminished solar incidence during these periods.

Rotation of the f/0.25 parabola considered in this example about its focus minimizes the volume swept out as it tracks the sun. This is advantageous for placement of the collector on crowded rooftops, and minimizes the size, weight, and cost of an envelope to house the collector.

The data in Table 1 summarize the performance of the solar collector described above. The second and third columns in Table 1 tabulate the predicted efficiency as a function of solar elevation. The efficiency is defined as the luminous flux exiting the segment of duct depicted relative to that crossing an un-occluded disc of diameter Dparabola=60 inches oriented normal to the solar incidence. Two values are reported, labeled 'on-axis' and 'total'. The on-axis efficiency counts only flux exiting within 30 degrees of the duct axis. The total efficiency counts all downwards-propagating flux. The distinction between on-axis and off-axis (off-axis=total−on-axis) flux is relevant in daylighting to, for example, the attenuation of flux in transport ducts and the occurrence of glare in the emission from luminaires. The near equality of the on-axis and total efficiencies indicates that the output of the collector is nearly entirely on axis, as is preferred.

TABLE 1

| Solar Elevation, degrees | Efficiency | | Atmospheric Attenuation | Lumens |
|---|---|---|---|---|
| | On Axis | Total | | |
| 0 | 0.628 | 0.628 | 0 | 0 |
| 10 | 0.649 | 0.650 | 0.326 | 31,000 |
| 20 | 0.686 | 0.689 | 0.624 | 62,000 |
| 30 | 0.732 | 0.737 | 0.783 | 83,000 |
| 40 | 0.778 | 0.784 | 0.873 | 99,000 |
| 50 | 0.796 | 0.804 | 0.928 | 107,000 |
| 60 | 0.808 | 0.812 | 0.963 | 113,000 |
| 70 | 0.815 | 0.815 | 0.984 | 117,000 |
| 80 | 0.816 | 0.816 | 0.996 | 118,000 |
| 90 | 0.819 | 0.819 | 1.000 | 119,000 |

The fourth column tabulates the atmospheric attenuation of direct solar luminance relative to the attenuation at 90-degrees elevation. In the absence of clouds and haze, the direct solar flux crossing a disc of diameter Dparabola oriented normal to the solar incidence can be readily calculated using known parameters.

The final column tabulates the predicted luminous flux output by the collector, evaluated according to the formula shown below. The output flux is 1) the flux available to the collector, described above, times 2) the transmissivity of an example clear dome housing the collector (set to 83% transmissivity), times 3) the on-axis efficiency of the collector, times 4) the transmissivity of a window in the roof of the building at the end of the duct segment (that is, positioned at the entrance aperture, and having a transmissivity of 96% averaged over the solar spectrum). This provides the on-axis flux which the collector provides to the transport and distribution components of a daylighting system.

The collimation of the output can be adjusted without dramatically altering the efficiency by changing the focal separation of the hyperbola. In particular, the collimation can be increased so as to reduce the attenuation of flux in long transport runs by increasing the focal separation.

The distribution component of a daylighting system generally prefers an angular distribution of luminance at its inlet which is less collimated than that output by the subject collector. The extraction of light via interaction with the perimeter of a duct requires repeated intersections of rays with the perimeter. These occur more frequently as the collimation of the injected flux decreases. Also, re-equilibration of flux within the duct after perturbation by extraction or redirection occurs over shorter distances as the collimation decreases. Many distribution systems are designed to accept flux from collimated artificial sources. Generally, it is desired to have a smaller collimation angle for larger transport distances, and then change the light transport to have a larger collimation angle for extraction of the light from the duct.

It is to be understood that other details of the collector design might be altered within the scope of the present disclosure to achieve desired effects such as higher efficiency or tighter collimation. These include, for example, the diameter of the outlet duct; the vertical placement of the inlet aperture; the reflectivities of the parabolic mirror, hyperbolic mirror, and duct; and the hyperbola diameter, focal length and acceptance angle. They also include changes arising due to unavoidable imperfections in fabrication that might diminish performance, such as relative placement and orientation errors or increased parabolic dither. It should be recognized that the efficiencies realized by the two detailed designs considered above (as high as 0.819) are sufficiently close to the theoretical maximum value of one as to suggest that substantial increases in the collected flux beyond the maximum value of 120,000 Lumens may only be possible with a larger parabola.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A solar collector, comprising:
   a parabolic reflector having a vertex, a parabolic focal point, and a first axis therebetween; and
   a hyperbolic reflector having a first focal point coincident with the parabolic focal point, a second focal point, and a second axis including the first and second focal points;
   wherein the first axis can be aligned at an elevation angle and an azimuth angle without movement of the second axis, such that solar radiation incident upon the parabolic reflector and reflecting from the hyperbolic reflector, propagates within an output collimation angle of the second axis,
   further comprising an exit aperture disposed in the parabolic reflector, along a line passing through the vertex of the parabolic reflector, wherein the exit aperture comprises a slot that extends to a rim of the parabolic reflector.

2. The solar collector of claim 1, wherein the hyperbolic reflector is affixed to the parabolic reflector such that the hyperbolic reflector and the first axis collectively rotate around the second axis, as the first axis is aligned to the azimuth angle.

3. The solar collector of claim 1, wherein the hyperbolic reflector remains stationary as the first axis is aligned to the azimuth angle.

4. The solar collector of claim 1, wherein the exit aperture comprises a material that is transparent to solar radiation.

5. The solar collector of claim 1, further comprising a light duct disposed along the second axis and capable of accepting solar radiation propagating within the output collimation angle of the second axis.

6. The solar collector of claim 5, wherein the light duct is a hollow reflective light duct having an input aperture.

7. The solar collector of claim 5, wherein the light duct includes an input aperture disposed proximate the second focal point.

8. A solar collector, comprising:
   a parabolic reflector having a vertex, a parabolic focal point, and a first axis therebetween;
   a hyperbolic reflector having a first focal point coincident with the parabolic focal point, a second focal point, and a second axis including the first and second focal points;
   an exit aperture disposed in the parabolic reflector and on a plane defined by the first and second axis; and
   a light duct disposed along the second axis;
   wherein the first axis can be aligned at an elevation angle and an azimuth angle without movement of the hyperbolic reflector or the light duct,
   wherein the exit aperture comprises a slot that extends to a rim of the parabolic reflector.

9. The solar collector of claim 8, wherein the exit aperture comprises a material that is transparent to solar radiation.

10. The solar collector of claim 8, wherein the second focal point is proximate an input aperture of the light duct.

11. The solar collector of claim 8, wherein the second focal point is within the light duct.

12. The solar collector of claim 8, wherein the light duct extends through the exit aperture.

13. The solar collector of claim 8, wherein the hyperbolic reflector is affixed to the light duct.

14. The solar collector of claim 8, wherein the first axis is aligned toward the sun.

15. The solar collector of claim 8, wherein the light duct comprises a reflective hollow light duct.

16. The solar collector of claim 8, wherein an input light ray within a first collimation half-angle of the first axis reflects from the parabolic reflector, reflects from the hyperbolic reflector, and is directed into the light duct within a second collimation half-angle of the second axis.

17. A solar collector, comprising:
   a parabolic reflector having a vertex, a parabolic focal point, and a first axis therebetween;
   a hyperbolic reflector having a first focal point coincident with the parabolic focal point, a second focal point, and a second axis including the first and second focal points;

an exit aperture disposed in the parabolic reflector and on a plane defined by the first and second axis; and a light duct disposed along the second axis;

wherein the first axis can be aligned at an elevation angle and an azimuth angle, and at least one of the hyperbolic reflector and the light duct rotates around the second axis, wherein the exit aperture comprises a slot that extends to a rim of the parabolic reflector.

18. The solar collector of claim 17, wherein the exit aperture comprises a material that is transparent to solar radiation.

19. The solar collector of claim 17, wherein the second focal point is proximate an input aperture of the light duct.

20. The solar collector of claim 17, wherein the second focal point is within the light duct.

21. The solar collector of claim 17, wherein the light duct extends through the exit aperture.

* * * * *